United States Patent

[11] 3,593,632

[72] Inventor Bobby S. Woodruff
 2308 Gallatin S.W., Huntsville, Ala. 35801
[21] Appl. No. 821,278
[22] Filed May 2, 1969
[45] Patented July 20, 1971

[54] VOLUME RECORDER
 4 Claims, 3 Drawing Figs.
[52] U.S. Cl. .................................................. 95/11,
 73/149, 346/107, 353/28
[51] Int. Cl. ............................................... G03b 19/00
[50] Field of Search ................................................ 95/11;
 346/107; 73/149; 353/79, 80, 28; 356/156, 157,
 164, 171

[56] References Cited
UNITED STATES PATENTS

| | | | |
|---|---|---|---|
| 564,971 | 8/1896 | Cline | 356/164 |
| 2,556,871 | 6/1951 | Degnan | 356/164 |
| 2,665,608 | 1/1954 | Clark | 353/28 |
| 2,826,113 | 3/1958 | New | 356/164 |

Primary Examiner—Samuel S. Matthews
Assistant Examiner—Monroe H. Hayes
Attorney—C. A. Phillips ABSTRACT: An automatic pulpwood recorder for measuring the volume of pulpwood loaded on a railroad car in which cameras are placed over and on each side of a railroad track and by means of car-position sensing switches the cameras are operated each time a car is centered with respect to the cameras.

PATENTED JUL 20 1971

3,593,632

Bobby S. Woodruff,
INVENTOR

BY C. A. Phillips
ATTORNEY

VOLUME RECORDER

This invention relates to volume measurement systems and particularly to a recording and measurement system for the measurement of pulpwood or other material loaded on railroad cars.

Typically pulpwood is cut in 5 foot lengths and stacked on rail cars in two rows for shipment. The present method employed by the consignee of the shipment is to stop the train and manually measure with a tape the height of log tiers on each side of each car in three locations and then determine an average height. With car length known and log lengths assumed to be known, volume is computed as an approximate figure. This figure is used for several purposes including the determination of freight to be paid the railroad company. The measurements are presently made by hand and result in considerable expense both from the point of view of man power required to make the measurements and lost time for the train and train crew during the stoppage required for the measurements.

It is an object of the present invention to provide a means for measurement of pulpwood on railroad cars which does not require manual measurement.

It is a further object of this invention to provide such a measurement system wherein it is unnecessary to actually bring railroad cars to a halt.

It is a further object of this invention to improved the accuracy of the measurements of the category described.

In accordance with the present invention, three cameras are positioned adjacent a railroad track to photograph moving railroad cars as they reach a point opposite the cameras. One of the cameras is positioned above the car and it provides a photograph for measurement of the width of the load at as many points along the load as deemed necessary for accurate determination of a mean width. Typically 10 points would be used as will be described below. The other two cameras are positioned on each side of the track and thus record the height of the load which may be, again, checked at as many points along the length of the car as deemed necessary. Both sides of the car are thus photographed in as much as generally two rows, end to end, of pulpwood logs are stacked across the car so that the loading of one side of the car may, or may not, be identical to the loading of the other side of the car.

The cameras are tripped, or the shutters actuated, by means of an electrical system which senses when a railroad car occupies a central position with respect to the cameras at which time they are operated. Two sets of spaced wheel proximity, or other electrical switches for operating the cameras, are placed along the track, being spaced a distance corresponding to a distance which is twice the distance from the center of a car to the point on one end of the car which operates a switch. In one embodiment of the invention, the switches are operated by two wheels of the end trucks of double truck equipped car. In order to make the system responsive to different length cars, each set of switches includes as many individual switches as there are different size cars and spacing is dictated by the particular car lengths involved. In accordance with one version of the system of this invention, the cameras require only one electrical signal to trip the shutters and advance the film for the next exposure. In a second version of the system a separate set of electrical switches are employed to perform the film transport function. The second set of switches may either be an identical set but spaced from the first set or may in fact represent a set of time delayed switches which when energized by a shutter signal provide a delayed signal for operating the film transports of the cameras. An amount of delay may be regulated by a conventional resistance capacitance circuit to achieve whatever time delay is necessary to give the shutters ample time for operation before film transport for the next exposure occurs.

Other objects, features and advantages of the invention will become more apparent from the following description when considered together with the accompanying drawings in which.

Figure 1:
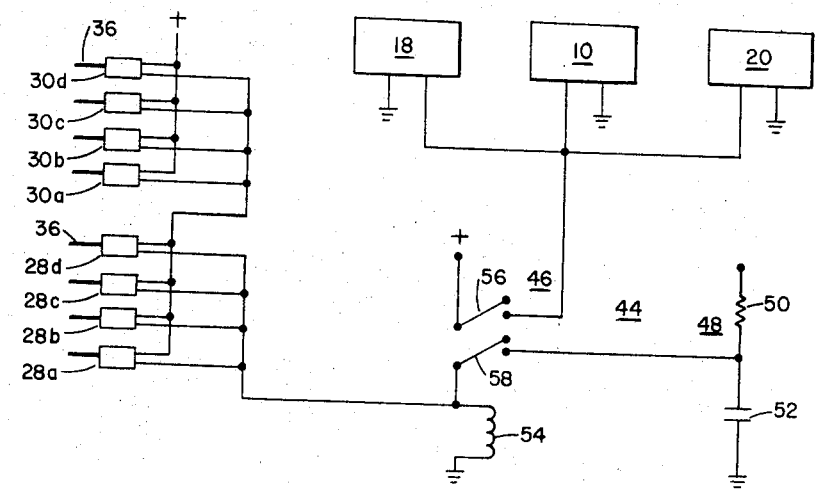
FIG. 1 is an electrical schematic circuit diagram of an embodiment of this invention.
Figure 2:
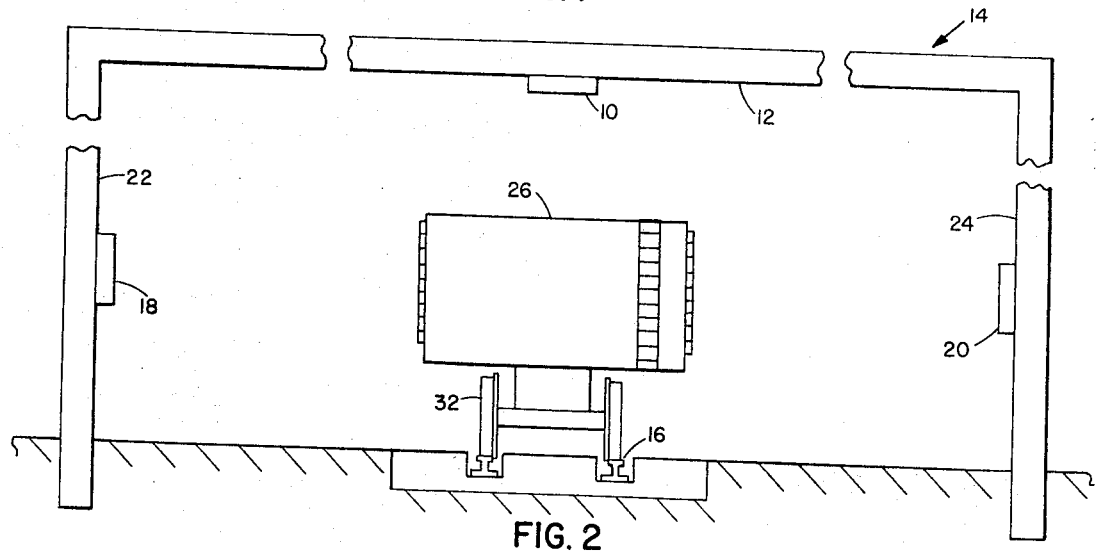
FIG. 2 is an elevation view along a rail track showing the camera mounting arrangement of the invention.
Figure 3:
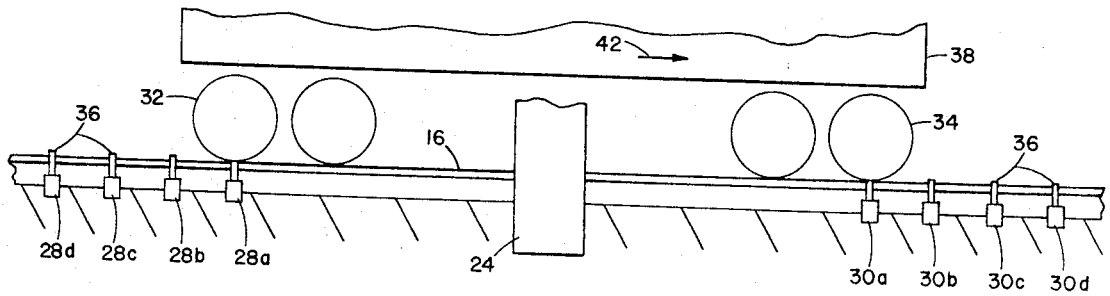
FIG. 3 is a side elevation view of the system shown in FIG. 2.

Referring now to the drawings, an electrically operated camera 10 is mounted on top horizontal member 12 of supporting frame 14 which is constructed across rail track 16. Cameras 18 and 20 are mounted on vertical members 22 and 24 of frame 14, respectively. Camera 10 is thus positioned to view the top and cameras 18 and 20 are positioned to view the sides of a rail car 26 passing along track 16. A first set of car position detecting switching networks 28 are positioned along track 16 on one side of frame 14 and a like set of car detecting switching networks 30 are positioned along track 16 on the opposite side of frame 14.

Switching networks 28 and 30 each consist of a network of 4 switches and are labeled switches 28a, b, c, and d and 30a, b, c, and d wherein like letter identified switches are spaced a distance apart equal to the distance between outer or extreme end wheels 32 and 34 of car 26. As illustrated, switches 28a and 30a are positioned opposite wheels 32 and 34 of car 26 and in this illustration car 26 represents the shortest length car anticipated to be encountered by the system of this invention. The orientation and positioning of elements in this system, switching networks and cameras, are such that the outer wheels 32 and 34 of a given rail car are simultaneously sensed by a like lettered set of switches to energize cameras 10, 18 and 20. Switches 28b and 30b are adapted to respond to the next larger size car, or b size car; switches 28c and 30c are adapted to respond to a still larger car, which we will term a c size car; and switches 28d and 30d are adapted to respond to the largest size car or a d size car. Switches of switching networks 28 and 30 are single-pole, single-throw, normally closed switches having an arm 36 which is operated by the leading edge of a wheel 32 or 34. Alternately, a switch of switching networks 28 or 30, might be of the proximity type in which the adjacent presence of a wheel 32 or 34 operates this switch or any type of switch which is adapted to sense a like point of position of a rail car. For example, the switches of switching network 30 may be adapted to respond to the leading edge 38 of a car 26 and the switches of switching network 28 be adapted to respond to the trailing edge 40 of a rail car 26, in which case the individual switches would be appropriately repositioned with respect to frame 14. Where the leading edge of an element of rail car 26 is employed, as in the case of the leading edges of wheels 32 and 34 or leading edges 38 and 40 of the ends of car 26, the arrangement would be such that the car would be traveling in the direction of arrow 42. Actually the tolerance of positioning of switches of switching networks 28 and 30 is such that these switches may be positioned to be operated regardless of the direction of movement of car 26 and in the case of switches adapted to be operated by the leading edge 38 and trailing edge 40 of car 42 it would only be necessary to change the logical function of the switches in order to accommodate a car moving in the opposite direction. This can be readily achieved by means of using combined normally open and normally closed contact-type switches.

In order to insure that cameras 10, 18 and 20 are energized for a sufficient period in order to accommodate the complete cycle of a camera, the operation of shutters followed by the transport of film for the next exposure, despite varying periods of closing of the switches of switching networks 28 and 30, with varying speeds of car 26, the outputs of the switches produce fixed periods of camera energizing signals. Camera energizing circuit 44 consists of a double-pole, single-throw switch 46 and timing circuit 48. Timing circuit 48 is a resistance-capacitance circuit employing resister 50 and capacitor 52 which operates to hold relay 46 closed after the energizing potential from switching networks 28 and 30 is removed. This is accomplished by means of charging capacitor 52 through resister 50 during the relatively long period of time between camera operations, compared with the time of actual operation. Resister 50 is sufficiently large in value so that the voltage dropped across it would be too great to operate relay coil 54 alone after the charge on capacitor 52 has dropped below a predetermined value. As illustrated, cameras 10, 18 and 20 are powered through contacts 56 of relay 46 for the period of time that relay 46 is operated. Since relay coil 54 is held on by capacitor 52 through contacts 58, once it has been closed by the signal through switching networks 28 and 30 the operation of 54 is relatively independent of switching time of switching networks 28 and 30 and thus independent of the speed of a train of cars transisting the system. The period of operation of relay 46 is adjusted by the value of capacitor 52 to hold contacts 56 closed sufficiently long for the shutters of cameras 10, 18 and 20 to have been operated and the film transport mechanism of each camera to transport the film and reset the cameras for the next photograph. While the actual electrical tripping and electrical film transport systems of the cameras are not shown, it is to be appreciated that cameras so equipped are commercially available.

To consider the operation of the system of this invention, assume that car 26 has just progressed to the point indicated and thus switches 28a and 30a are closed. When this occurs, power is applied through switches 28a and 30a to coil 54 of relay 46. This causes relay contacts 56 and 58 to be pulled closed. Cameras 10, 18 and 20 are energized through contacts 56 and as capacitor 52 continues to power relay coil 54 and hold contacts 56 and 58 closed after car 26 is passed beyond switches 28a and 30a, power is continued to be supplied to cameras 10, 18 and 20 for the predetermined period necessary to operate the shutters of these cameras, take pictures of car 26 from both sides and the top and then to cause the film transport mechanism of these cameras to be advanced for the taking of photographs of the next car behind car 26, not shown, This process continues from car to car and in this manner a photographic record of cars is made so long as film is in the cameras. Typically, cameras would contain film for 250 exposures which would be more than adequate for a typical train of cars. The exposed film is processed in the normal manner and projected upon a screen on which, for example, a Simpson one-third rule graph is imprinted and the scale of the projected image adjusted to fit the graph. The two side photographs and top photograph are graphically measured in this manner and the volume of pulpwood in a car very accurately determined.

The invention disclosed herein provides an improved method of measuring pulpwood and any similar loaded materials on open cars. As described, it offers the improvement that a train need not be stopped in order to make measurements and tedious, time consuming and costly hand measurements are avoided. Further, by virtue of the final analysis of the projected images, it is very easy to determine not merely three points of measurement (as normally the case with hand measurements) but 10 points of measurement and thus a much more accurate total volume determined.

Having thus described my invention, what I claim is:

1. An automatic pulpwood recorder comprising:
   A. First, second and third electrically operated cameras, each including means responsive to an electrical signal for taking a picture each time that a said electrical signal is received;
   B. Mounting means for positioning said first camera on one side of a railroad track and oriented for viewing one side of a railroad car passing along said track;
   C. Mounting means for positioning said second camera on the opposite side of said railroad track for viewing the opposite side of a railroad car passing along said track;
   D. Mounting means for positioning said third camera above a railroad track for viewing the top side of a said railroad car passing along said track;
   E. Camera control means comprising:
      1. first position sensing means positioned at a first point along said railroad track for sensing a first point on a railroad car centered on said track with respect to said mounting means and of at least one predetermined length, which point is a predetermined distance from one end of said railroad car,
      2. second position sensing means positioned at a second point along said railroad track for sensing a second point on a said railroad car of at least said one predetermined length, which second point is a predetermined distance from the opposite end of said railroad car, and
      3. signal means responsive to said first and second position sensing means for providing an electrical signal to said first, second and third cameras each time that a said railroad car is in a position to operate said first and second position sensing means simultaneously whereby said railroad car is photographed from each side and from the top and thus recording height and width of pulpwood on said railroad car.

2. A pulpwood recorder as set forth in claim 1 wherein the said first position sensing means further comprises means for sensing a said first point on railroad cars of at least two different lengths and said second position sensing means further comprises means for sensing a said second position on railroad cars of at least two different lengths.

3. A pulpwood recorder as set forth in claim 2 wherein each said position sensing means includes one electrical switch for each said different length railroad car, said switches being spaced along said railroad track and adapted to be operated by a wheel of a said railroad car passing a predetermined point.

4. A pulpwood recorder as set forth in claim 3 wherein said signal responsive means comprises means responsive to the simultaneous operation of a said switch of said first position sensing means and a said switch of said second position sensing means for providing a said electrical signal to said first, second and third cameras of at least a predetermined duration, whereby the speed of passing of a said railroad car and thus the period of operation of a said switch would not shorten the period of said signal to said cameras, insuring that a signal of sufficient duration is provided said cameras for their operation.